United States Patent Office

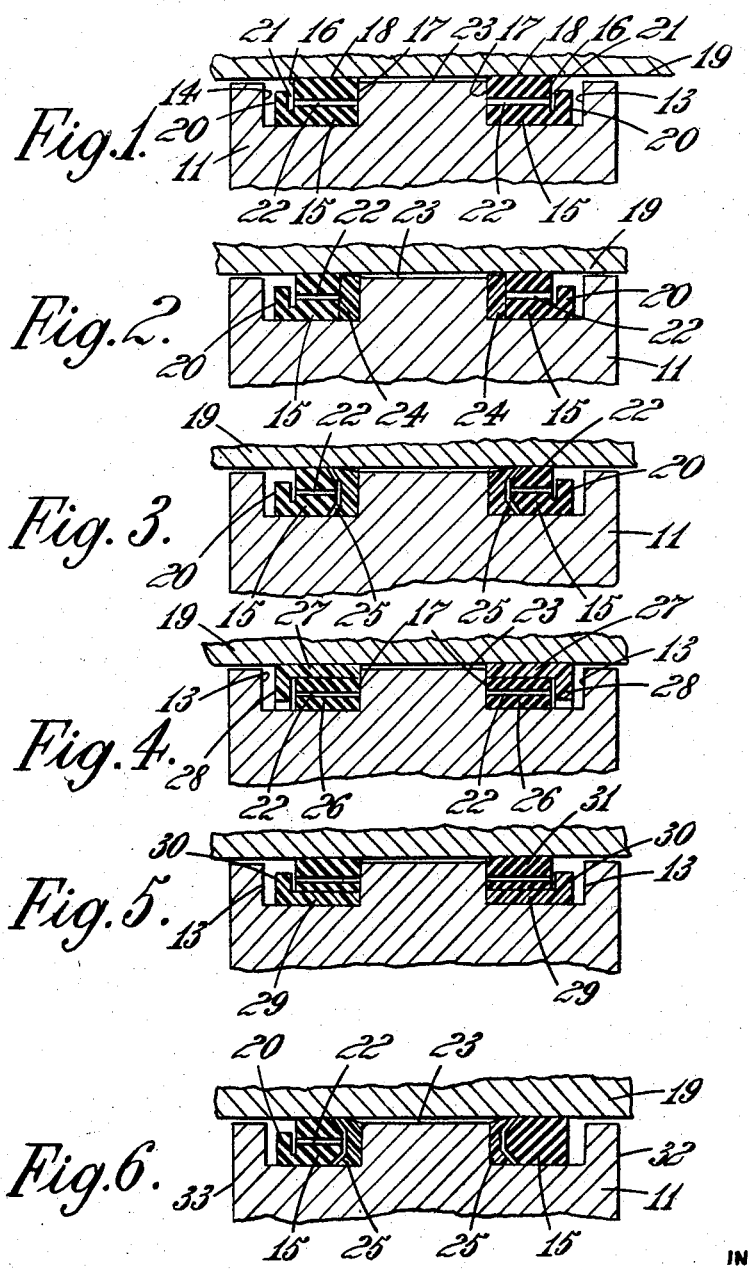

2,876,025
Patented Mar. 3, 1959

2,876,025

SEALS FOR PISTONS, GLANDS AND THE LIKE

George Orloff and Bernard Charles Smithers, Gloucester, England, assignors to British Messier Limited, Gloucester, England, a British company Application October 25, 1955, Serial No. 542,564

Claims priority, application Great Britain November 1, 1954

5 Claims. (Cl. 286—26)

This invention comprises improvements in or relating to seals for pistons, glands and the like.

The invention relates to the type of seal assembly in which two sealing rings of resilient material such as for example synthetic rubber are located in series in grooves formed in one member of the joint so that they bear against the sliding surface of the other member of the joint. In such seals, one of the sealing rings is forced by pressure on one side of the joint against one face of its groove, and is expanded by the pressure further into contact with the relatively moving wall, so producing a tight seal. The other ring seals the joint against pressure in the opposite direction. It has been found that a pressure build-up occurs in the space between the two sealing rings when there is frequent movement to and fro, and it has been proposed to limit this pressure build-up by venting the space by vents drilled through the metal of the grooved joint-member either to atmosphere or in some cases such as hydro-pneumatic accumulators containing a separator-piston by venting it through a non-return valve to the oil-pressure space. This is a somewhat complex arrangement, and it is the object of the present invention to avoid vents drilled in the metallic parts and to enable the build-up of pressure to be avoided in the case where the grooves for the sealing rings have not been specially made or vented.

In United States application Serial No. 466,124, dated November 21, 1954, Patent No. 2,843,433, issued July 15, 1958, we have described constructions in which vent openings are provided in one or both of the sealing rings themselves in combination with separate resilient means bearing on the vent openings at one end and acting as a valve to permit escape of pressure but to prevent leakage through the sealing ring when pressure is applied thereto on the valve side thereof.

According to the present invention a sealing ring for use in a seal assembly of the type described comprises a ring part of resilient material provided with a sliding seal surface and pierced by vent means spaced from said surface, and one or more valve members attached to said ring part and adapted to close said vent means against passage of fluid under pressure in one direction only.

By "attached" in the above statement is meant that the ring part and the valve member or members are integral or separably or inseparably connected together in such a way as to form a self-sustaining unit for assembly purposes.

The invention also includes a seal assembly comprising a sealing ring according to this invention as defined above, in combination with an attached or separate ring of harder material adapted to prevent extrusion of the softer material through the gap closed by the seal assembly.

According to a further feature of the invention the valve member or members may be composed of synthetic rubber-like material and be bonded to said resilient ring part.

In many cases, for example, where pressure is exerted continuously against one face of a piston and intermittently against the other, it is found adequate to use a combination of vented and unvented seals, i. e. to have an unvented seal in the groove nearer the continuous pressure and a vented seal in the groove nearer the intermittent pressure.

The following is a description by way of example of certain constructions in accordance with the invention. Referring to the accompanying drawing:

Figure 1 is a longitudinal section through part of a cylinder wall and one side of a piston in engagement therewith, showing one construction in accordance with this invention;

Figure 2 is a similar view of an alternative construction, and

Figures 3 to 6 inclusive are similar views of further alternative constructions.

In construction shown in Figure 1, a piston is provided with two rectangular grooves 13, 14 to receive sealing rings 15, 15. In each groove the rubber sealing ring 15 is of such radial dimensions that under pressure applied to its end-face 16, it will make a tight joint both on its inner face 17 with the face of the groove in the piston and on its outer circumferential face 18 with the cylinder 19 within which the piston works. Each sealing ring is of substantially smaller dimensions in an axial direction than the width of the groove 13, or 14 in which it seats, and extending from its end face 16 remote from the other groove is a valve member 20 the radial dimension of which is approximately two thirds that of the main part of the sealing ring. In the plane of the step so formed the sealing ring is provided with a radial slit 21 which extends from the corner of the step more than half-way into the thickness of the ring at this part. The ring is pierced by vent passages 22 at intervals around its circumference which passages are spaced inwardly from the sliding surface and extend parallel to the axis of the ring from the radial slit 21 to the face 17 of the ring. Thus the valve member 20 can close the vent passages 22 at their ends where it overlies the passages. The effect is that if pressure collects in the space 23 between the two rings, the pressure can force the sealing ring which is on the side where the piston is not subject to pressure, away from the side of its groove, and the vent passages 22 through the ring act to relieve this pressure, the resilient valve member 20 being forced away from the ends of the vent passages. If desired the valve member 20 may be slid radially at intervals around its circumference, or castellated, to form separate flaps of greater resilience, one for each vent passage 22. Such a ring may be used either in an external groove in a piston as shown, with its longer or outer peripheral surface as the sliding seal surface, or it can be in an internal groove in say, a stuffing box, with its inner or shorter periphery sliding over a rod.

It may be advantageous as shown in Figure 2, to back up the sealing ring 15 by another ring 24, on the opposite side from the non-return valve 20, such backing ring consisting for example of "nylon," "skulon," resin impregnated material or polytetrafluoroethylene or the like, to prevent extrusion of the rubber sealing ring 15 through the gap 23 between the piston 11 and its cylinder 19.

In another construction shown in Figure 3, the backing ring may on its face adjacent the sealing ring be of channel section as shown at 25, the sealing ring 15 on its adjacent face being of a section corresponding therewith.

A further construction is shown in Figure 4, in which the sealing ring comprises two parts made of different material joined together. Each groove 13 is provided with a first rubber ring part 26 of rectangular cross-section whose radial dimension is approximately two-thirds of the depth of the groove and whose axial-width is approximately two-thirds the width of the groove.

This ring part is seated in the groove so that its inner face abuts against the inner face 17 of the groove, and is provided with axially extending vent passages 22 which pass through it. A second part 27 made of harder rubber, rubberised fabric, nylon, skulon or polytetrafluoroethylene or the like, is of L-shaped cross-section and is mounted upon the first ring part with its longer limb lying parallel with the vent passages 22 and forming on its outside the sliding surface which cooperates with the wall 19 of the cylinder to form the seal. The shorter limb 28 of this ring projects radially inwardly over the end face of the ring 26 and over the vent passages 22. This resilient shorter arm together with the vent passages therefore forms, as in the first construction described, a non-return valve member which overlies the vent passages.

In an alternative arrangement, shown in Figure 5, a ring 29 of L-shaped cross-section is mounted in the groove 13 with its short limb 30 extending radially outwardly while a ring 31 of rectangular cross-section is mounted on the longer limb of ring 29, its outer periphery forming the sliding seal surface. Passages 22 are provided in the ring 31 as before and the resilient shorter limb 30 overlaps the outer ends of these passages thereby forming a non-return valve member, as before.

Figure 6 shows a construction similar to that of Figure 3, but the vent passage 22 is formed in one only of the rings 15. In this case it is assumed that a constant pressure obtains on the face 32 of piston 11 toward which the unvented piston ring lies. Escape of trapped fluid from the space 23 then occurs only when the pressure on the opposite face 33 of the piston falls sufficiently to permit this.

With regard to the backing rings 24, 25 it has been found that for working temperatures up to 120° C., nylon is a suitable material. At temperatures higher than 120° C. poly-tetra-fluoro-ethylene is preferable. Another possible alternative material is that known as "Kel. F." elastomer. The best material for the purpose however, for elevated temperatures is made of fibreglass held together by a plastic substance such as polytetrafluoroethylene.

We claim:
1. A seal assembly comprising in combination two relatively sliding joint members one within the other, one of said joint members being grooved in two places circumferentially, sealing rings in said grooves whereof at least one is pierced by vent means spaced from its sliding sealing surface, a valve member attached to said one joint member and adapted to close said vent means against passage of fluid under pressure in the direction away from the space between the sealing rings and a separate ring of glass fibre held together by a plastic substance in the same groove as said sealing ring and valve member and adapted to prevent extrusion of the sealing ring material.

2. A fluid pressure seal assembly comprising in combination two relatively slidable joint members one within the other, a pair of spaced circumferential grooves in one of said members, a pair of sealing rings, of deformable resilient material which under axial pressure expands radially to effect a seal, disposed in said grooves and shorter in an axial direction than the grooves so as to be free to move along the bases thereof, at least one of said rings being pierced by vent means spaced from its sliding sealing surface, and valve means carried by said ring and adapted to permit exit of fluid through said vent means from the space between said grooves but to close said vent means against passage of fluid into said space.

3. A seal assembly as claimed in claim 2 wherein a vented ring having valve means in one ring only of the assembly is provided and the other ring is unvented.

4. A seal assembly as claimed in claim 2 wherein a vented ring having valve means in both rings of the assembly is provided, both rings being vented.

5. A fluid pressure seal assembly comprising in combination two joint members relatively slidable one within the other, a pair of spaced circumferential grooves in one of said members, a pair of sealing rings, of deformable resilient material which under axial pressure expands to effect a seal, disposed in said grooves and shorter in an axial direction than the grooves so as to be free to move along the bases thereof, at least one of said rings being substantially rectangular in axial section, one of its cylindrical surfaces constituting a sliding seal surface, said ring being pierced by vent means spaced from said surface and opening on to its fluid end face, valve means attached to said ring to bear on one of said end faces and adapted to close said vent means against passage of fluid under pressure into the space between said grooves, but to permit exit of fluid through said vent means from said space.

References Cited in the file of this patent

UNITED STATES PATENTS

| | | |
|---|---|---|
| 2,076,363 | Brunner | Apr. 6, 1937 |
| 2,214,261 | Roth | Sept. 10, 1940 |
| 2,476,434 | Spang | July 19, 1949 |
| 2,660,493 | Flick | Nov. 24, 1953 |
| 2,676,823 | Olson et al. | Apr. 27, 1954 |
| 2,705,177 | Waring | Mar. 29, 1955 |
| 2,728,620 | Krueger | Dec. 27, 1955 |